United States Patent
Torigoe et al.

(10) Patent No.: US 7,686,266 B2
(45) Date of Patent: Mar. 30, 2010

(54) THREE LEGS CLIP FOR WINDSHIELD (ARTICLE SUPPORT)

(75) Inventors: Shinji Torigoe, Sagamihara (JP); Kazutomo Osada, Sagamihara (JP); Hidetoshi Yoshida, Sagamihara (JP); Yukihiro Maeda, Tokyo (JP); Atsushi Kakuta, Tochigi-Prefecture (JP); Isao Nakanuma, Tokyo (JP); Takayoshi Inagaki, Suzuka (JP); Kazuyuki Furubetsupu, Sayama (JP)

(73) Assignees: 3M Innovative Properties Company, St. Paul, MN (US); Honda Motor Co., Ltd, Tokyo (JP)

( * ) Notice: Subject to any disclaimer, the term of this patent is extended or adjusted under 35 U.S.C. 154(b) by 0 days.

(21) Appl. No.: 11/569,005

(22) PCT Filed: May 11, 2005

(86) PCT No.: PCT/US2005/016413

§ 371 (c)(1),
(2), (4) Date: Mar. 24, 2008

(87) PCT Pub. No.: WO2005/113989

PCT Pub. Date: Dec. 1, 2005

(65) Prior Publication Data

US 2008/0169388 A1    Jul. 17, 2008

(30) Foreign Application Priority Data

May 14, 2004  (JP) .............................. 2004-145375

(51) Int. Cl.
*E04G 5/06*  (2006.01)
(52) U.S. Cl. .............................. 248/222.12; 248/231.9; 24/297

(58) Field of Classification Search ............ 248/222.12, 248/231.9; 296/201, 84.1; 24/297, 453, 24/458; 403/DIG. 14
See application file for complete search history.

(56) References Cited

U.S. PATENT DOCUMENTS

| | | | |
|---|---|---|---|
| 4,575,060 A * | 3/1986 | Kitagawa | 269/43 |
| 4,627,760 A | 12/1986 | Yagi et al. | |
| 4,739,543 A * | 4/1988 | Harris, Jr. | 24/297 |
| 5,695,236 A * | 12/1997 | Banno et al. | 296/96.21 |
| 5,833,480 A * | 11/1998 | Austin | 439/95 |
| 6,305,892 B1 | 10/2001 | Qiao | |
| 6,324,732 B1 * | 12/2001 | Arisaka et al. | 24/458 |
| 6,471,313 B1 | 10/2002 | Ueda et al. | |
| 6,664,470 B2 * | 12/2003 | Nagamoto | 174/652 |
| 6,824,197 B2 * | 11/2004 | Benedetti | 296/146.15 |

FOREIGN PATENT DOCUMENTS

| | | |
|---|---|---|
| JP | 6-32132 | 2/1994 |
| JP | 7-39517 | 7/1995 |
| JP | 9-142141 | 6/1997 |
| JP | U2602629 | 11/1999 |
| JP | P3260256 | 12/2001 |

* cited by examiner

*Primary Examiner*—Korie H. Chan
(74) *Attorney, Agent, or Firm*—Harold C. Knecht, III

(57) ABSTRACT

An article support having a mount section comprising: a first engaging element (18) that has a pillar protruding from a base and a first hook extending from the pillar so that it can be displaced elastically; and a second engaging element that has a pillar protruding from the base and a second hook extending from the pillar so that it can be displaced elastically. The first hook and the second hook can be displaced elastically independently of each other and are disposed on the sides opposite to each other with respect to the pillars and. When the mount section is attached to an object, the pillar of the first engaging element bears a load on the object and the first hook and the second hook are engaged with the object to fixedly hold the article support on the object.

11 Claims, 7 Drawing Sheets

000

THREE LEGS CLIP FOR WINDSHIELD (ARTICLE SUPPORT)

FIELD OF THE INVENTION

The present invention relates to an article support for supporting an article while the article support is fixedly attached to another object.

BACKGROUND

There is known an article support for supporting an article fastened to a base while a mount section provided on the base is attached to another object, wherein the mount section mainly bears any load on the object. Such article support can be used, for example, for temporal fixing while adhesive is being cured when a window glass for a car is bonded to a window frame of a car body.

Japanese Unexamined Patent Publication (Kokai) No. 8-310233 discloses an article support used for temporal fixing of a window glass for a vehicle. This article support has: a base plate sticked on a window glass; a leg member standing on the base plate; and a nail section provided at a distal end of the leg member to be engaged with a vehicle body. When this article support is used, a mounting hole is formed at the edge of an opening (a window frame) of the vehicle body and, then, the leg member of the article support, the base plate of which is sticked on the window glass via pressure sensitive adhesive double coated tape, is inserted into the mounting hole from the distal end. It allows the nail section at the distal end of the leg member of the article support to be engaged with the edge of the mounting hole to support the window glass so that the window glass does not float from the vehicle body. Further, as a panel rising piece is formed adjacent to the mounting hole in the opening of the vehicle body, when the nail section at the distal end of the leg member of the article support is engaged with the edge of the mounting hole, a presser section provided at the base end of the leg member abuts against the rising piece so that the article support can bear the weight of the window glass and, therefore, the displacement of the window glass within the opening of the vehicle body due to its own weight can be prevented.

Further, Japanese Unexamined Patent Publication (Kokai) No. 9-142141 discloses an article support used for temporal fixing of a window glass for a vehicle, comprising: a base plate sticked on a window glass; a pair of hooks standing on a back surface of the base plate; and a spacer disposed between the hooks on the back surface of the base plate in a rockable manner. When this article support is used, a clip support section and notch sections on the both sides of the clip support section are formed in a window frame flange of a vehicle body. In the state in which the base plate is sticked on the window glass, the spacer is allowed to abut against the clip support section in the window frame of the vehicle and the window glass is pressed against the window frame of the vehicle while the spacer is being rocked with respect to the base plate so that the both hooks are engaged with the notch sections and the article support is fixedly fastened to the window frame of the vehicle. At this time, as the spacer abuts against the clip supports section continuously, the weight of the window glass can be borne and, on the other hand, the base plate and, thus, the window glass is fixedly held at a position separated from the window frame of the vehicle by a predetermined distance by cooperation of the spacer and the hooks.

Besides, though an article support used for temporal fixing of a window glass of a vehicle is also disclosed by Japanese Unexamined Utility Model Publication (Kokai) No. 6-32132, this article support cannot bear the weight of the window glass by itself. Further, an article support for temporal fixture of a window glass set forth in Japanese Unexamined Utility Model Publication (Kokai) No. 7-39517 adopts a hook-and-loop fastener structure as means for fastening to the window glass. In this configuration, as it is necessary to use two separate fastener components removably hooking on each other at one article supporting position, the operation for attaching the article support and parts control tend to become complicated.

DISCLOSURE OF THE INVENTION

The article support set forth above in Japanese Unexamined Patent Publication (Kokai) No. 8-310233 adopts a construction in which the rising piece is formed in the neighborhood of the mounting hole in the vehicle body, into which the leg member is inserted, and the presser section at the base end of the leg member is allowed to abut against the rising piece to bear loads such as the weight of the window glass. Therefore, this article support lacks versatility because the object, to which the article support is attached, must be provided with an abutment region for the presser section apart from the engagement position for the nail section even when this article support is used in applications other than the temporal fixing of the window glass. Moreover, as the leg member solely has both an engagement maintaining function of the nail portion and a load bearing function of the presser section, there is a tendency that the loads concentrate on the leg member and stress concentration occurs on the pressure sensitive adhesive double coated tape sticking the article support on the article (the window glass) in the region corresponding to the leg member. As a result, while the article is supported on the object, the article support is likely to be offset with respect to the article.

Further, the article support set forth above in Japanese Unexamined Patent Publication (Kokai) No. 9-142141 adopts a construction in which the spacer provided on the back surface of the base plate is allowed to abut against the clip supporting section provided in the flange of the window frame of the vehicle body so that the article support is positioned with respect to the window frame of the vehicle body before the hooks are engaged with the window frame of the vehicle body. Therefore, this article support also lacks versatility because the object, to which the article support is attached, must be provided with an abutment region for the spacer apart from the engagement position for the hooks. Moreover, as this article support has a construction in which the loads concentrate on one spacer, again, while the article is supported on the object, it is likely that stress concentration occurs on the adhesive layer for sticking the article support on the article (the window glass) and that the article support is offset with respect to the article.

Further, in recent years, the automobile manufacturing process including the operation for temporal fixing of the window glass described above becomes automated by robot. Further, there is developed a technique for aligning the article support on the window glass with the mounting hole on the vehicle body with high accuracy by robot so as to insert the mount section of the article support into the mounting hole accurately when the article support of the type described above is used for temporal fixing of the window glass. However, if the article support is fastened to the window glass with some rotation with respect to the normal position or the mounting hole is formed on the vehicle body with some deviation from the normal contour, the mount section may not be inserted into the mounting hole smoothly and the engagement maintaining elements (the nail section and the hooks) of the mount section may not be engaged with the edge of the mounting hole stably. It is desired that the mount section has adaptability to a certain error range so that the window glass can be temporarily fixed reliably without inhibiting automatic attachment of the window glass by robot also in such case.

The present invention can provide an article support for supporting an article fastened to a base while a mount section provided on the base is attached to another object, where the invention can exhibit one or more of the following advantages: positional displacement with respect to the article is not likely to occur while the article support bears any load on the object, the mount section has adaptability to a certain error range, and a construction of the attachment position on the object can be simplified.

In one aspect of the present invention, an article support is provided that comprises a base and a mount section. The article support is for supporting an article secured to the base on an object by attaching the mount section to the object. The mount section comprises a first engaging element including a pillar protruding from the base and a first hook extending from the pillar in an elastically displaceable manner; and a second engaging element including a pillar protruding from the base and a second hook extending from the pillar in an elastically displaceable manner; the first hook and the second hook being elastically displaceable independently of each other, and being disposed opposite to each other with respect to the pillars.

The pillar of the first engaging element and the pillar of the second engaging element can be spaced apart from each other on the base. The pillar of the first engaging element can protrude higher than the pillar of the second engaging element on the base. The pillar of the first engaging element can include a guide face that is able to contact the object during an attaching operation of the mount section to the object for guiding the first hook and the second hook toward a position for engagement with the object.

When the mount section is attached to the object, the pillar and the first hook of the first engaging element can be engaged with the object while the pillar of the second engaging element is not engaged with the object. When the mount section is attached to the object, the pillar of the first engaging element can bear a load on the object, and the first hook and the second hook can be engaged with the object to fixedly hold the article support on the object.

At least one of the first hook and the second hook can be supported at its both ends between the base and the pillar. At least one of the first hook and the second hook can include a spacer element for defining a predetermined minimum distance between the base and the object, when the mount section is attached to the object.

The present inventive article support can comprises one first engaging element, corresponding to the first engaging element, and a pair of second engaging elements, each corresponding to the second engaging element, where the second engaging elements are disposed at opposite sides of the first engaging element.

The first hook of the first engaging element and the second hook of the second engaging element can be elastically engaged with the object independently of each other so as to fixedly hold the article support with respect to the object and, at the same time, the pillar of any of the first and second engaging elements disposed on the opposite side to the hooks can be engaged with the object so as to bear loads such as the weight of the object. At this time, the first hook or the second hook can also act to bear the loads such as the weight of the object in an auxiliary manner. Therefore, concentration of loads on one engaging element and stress concentration on an adhesive layer, when the article support is fastened to the article via the adhesive layer, can be avoided and, while the article support bears any load on the object, positional displacement of the article support with respect to the article can be prevented. Further, as the mount section can fixedly hold the article support with respect to the object if either of the first hook and the second hook is engaged with the article accurately, the mount section has adaptability so that the positional displacement between them can be accepted to some extent. Still further, as the pillars of the first and second engaging elements having an engaging function mainly exhibit a load bearing function, the load bearing construction provided on the object correspondingly can be comprised of edges of the object, which are formed as indispensable elements for engagement with the first and second hooks and, therefore, the attachment positions on the object can be constructed simply.

The pillars can be displaced with respect to each other between the first engagement and the second engagement, they can be engaged with the object more independently of each other and, therefore, the adaptability of the mount section described above can be improved further. When the article support is attached to the object, if there is positional displacement between them, the pillar of the first engaging element can be engaged with the object at first so that the self-position of the article support can be corrected. The function to correct the self-position, as described above, can be improved by the guiding faces provided on the pillar of the first engaging element. As the pillar of the first engaging element bears the loads mainly and the first hook and the second hook are engaged with the object so as to fixedly hold the article support while the pillar of the second engaging element is not engaged with the object, the operation for engaging the mount section with the object can be facilitated.

The strength of at least one of the first hook and the second hook can be increased.

The predetermined minimum distance between the base and the object can be ensured without forming other protrusion and the like on the base additionally.

Both the engagement maintaining function and the load bearing function by the first and second engaging elements can be improved.

DETAILED DESCRIPTION OF EMBODIMENTS

Figure 1:
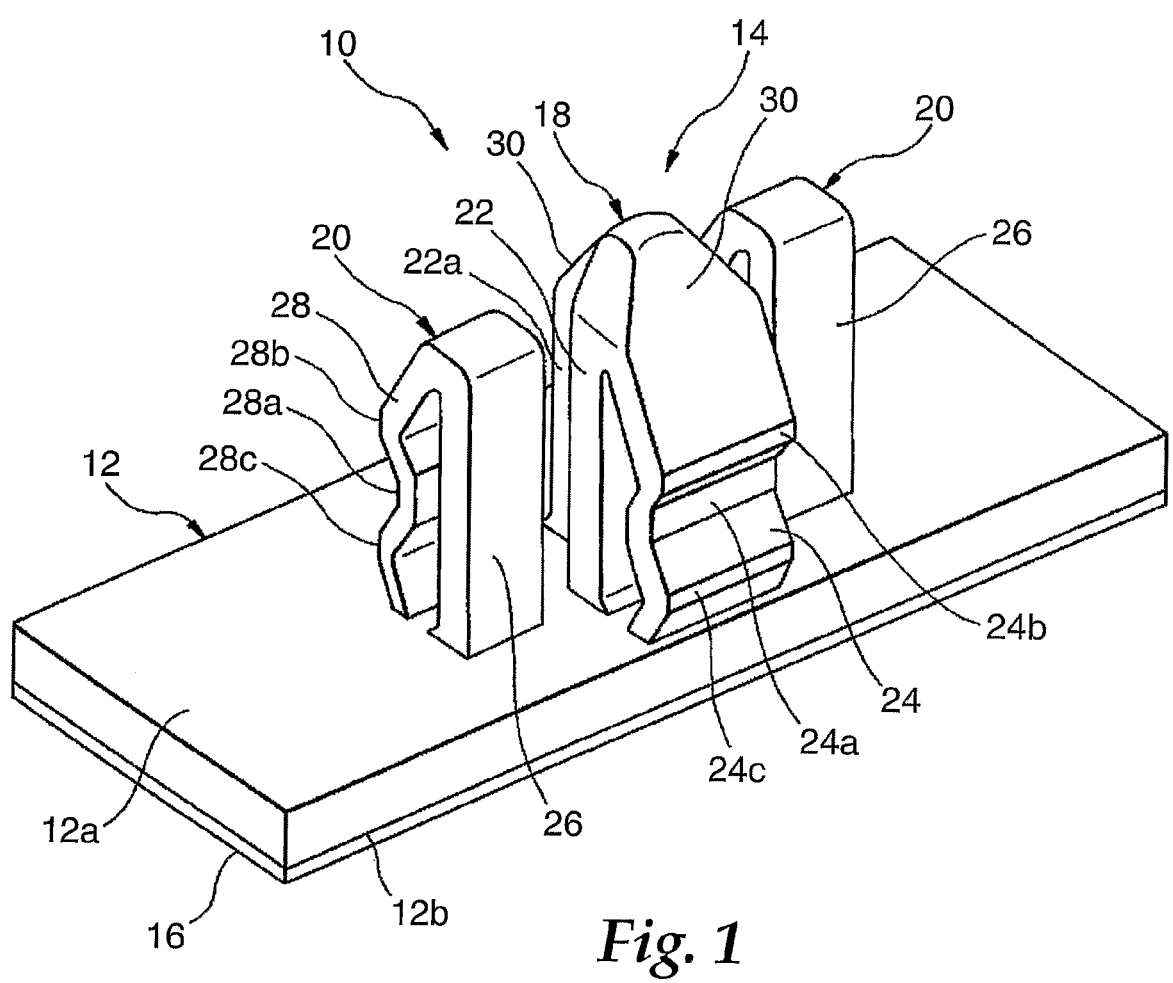
FIG. 1 is a perspective view of an article support according to an embodiment of the present invention.

Hereinafter, exemplary embodiments of the present invention will be described with reference to the accompanying drawings. Throughout the several views, like elements are designated by like reference numerals.

Figure 2A:
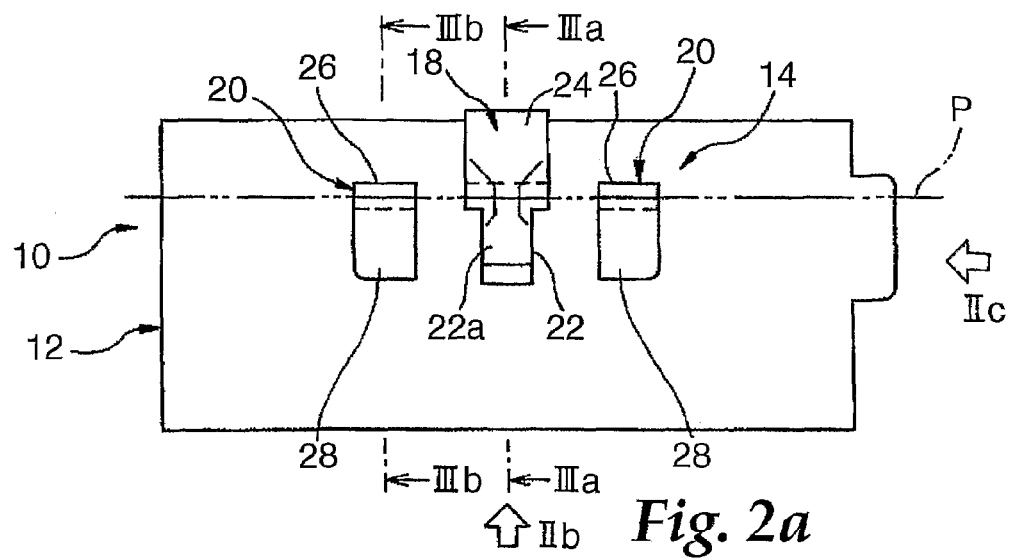
FIG. 2 is a three-part drawing of the article support of FIG. 1, wherein (a) is a plan view, (b) is a front elevation view taken from arrow IIb, and (c) is a side elevation view taken from arrow IIc.
Figure 2B:
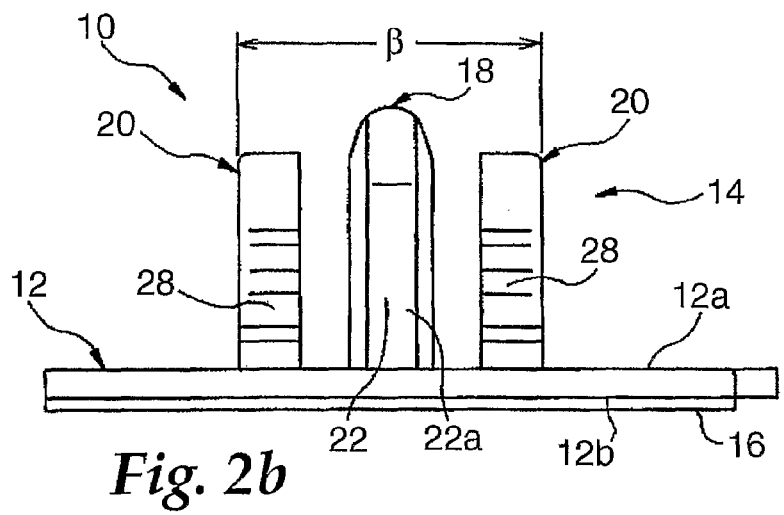
Figure 2C:
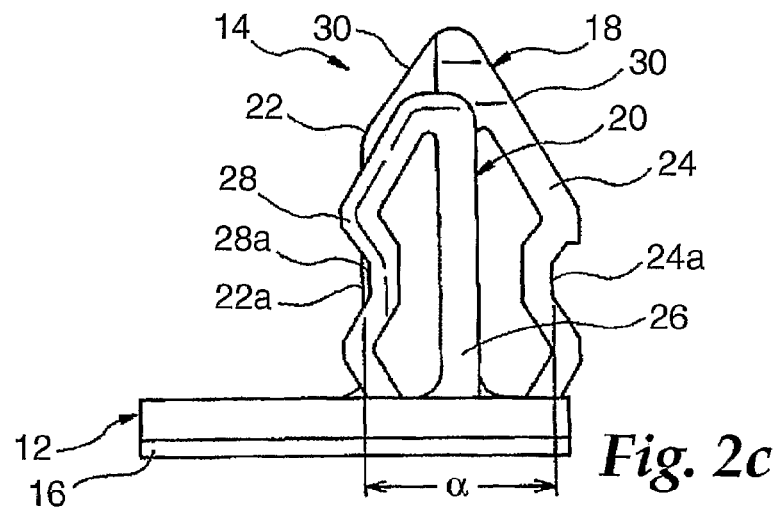
Figure 3A:
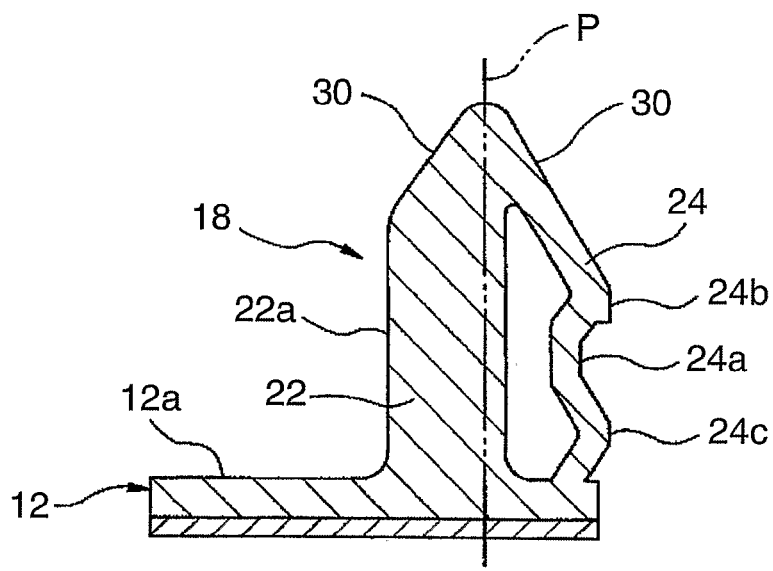
FIG. 3 is an illustration showing an engaging element of the article support of FIG. 1, wherein (a) is a cross-sectional view taken on line IIIa-IIIa in FIG. 2, and (b) is a cross-sectional view taken on line IIIb-IIIb in FIG. 2.
Figure 3B:
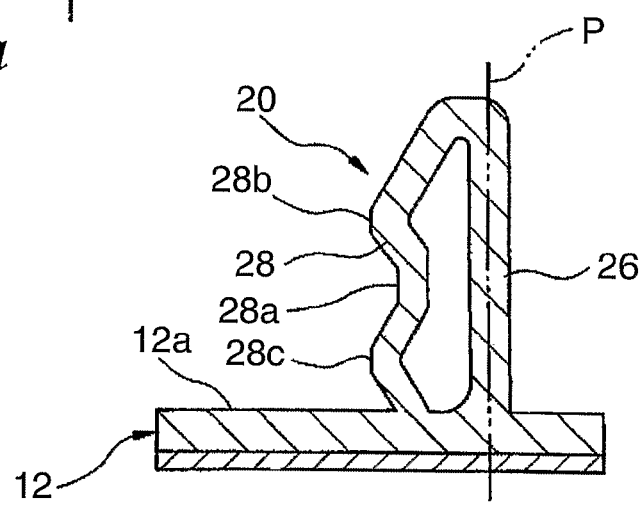

FIG. 1 is a perspective view of an article support 10 according to an embodiment of the present invention, FIGS. 2(a)-2(c) are a front view, a side view and a plan view of the article support 10, respectively, and FIGS. 3(a) and 3(b) are different cross-sectional views of the article support 10. The article support 10 comprises a base 12 and a mount section 14 provided on the base 12. The article support 10 having the base 12 and the mount section 14 is integrally formed of a resin material such as nylon, polybutylene terephthalate, polyacetal and the like.

The base 12 is a plate-like element that is rectangular when viewed from top and that has a top surface 12a and a back surface 12b, which are substantially flat and extend parallel to each other. An adhesive layer such as, for example, pressure sensitive adhesive double coated tape 16 for fastening an article to be supported may be disposed on the back surface 12b of the base 12.

The mount section 14 comprises a first engaging element 18 standing vertically on the top surface 12a of the base 12, and a second engaging element 20 standing vertically on the top surface 12a of the base 12. The first engaging element 18 has a pillar 22 that protrudes from the base top surface 12a, and a first hook 24 that extends from the pillar 22 so that it can be displaced elastically. On the other hand, the second engaging element 20 has a pillar 26 that protrudes from the base top surface 12a, and a second hook 28 that extends from the pillar 26 so that it can be displaced elastically. The first hook 24 of the first engaging element 18 and the second hook 28 of the second engaging element 20 can be displaced elastically independently of each other and are disposed on the base top surface 12a on the sides opposite to each other with respect to the pillars 22 and 26.

In the shown example, the pillar 22 of the first engaging element 18 and the pillar 26 of the second engaging element 20 are disposed on the base 12 so that they are separated from each other. Thus, the first engaging element 18 and the second engaging element 20 are formed on the base 12 as components that are independent of each other. Further, in the shown embodiment, one piece of the first engaging element 18 is mounted substantially at the center of the base top surface 12a and a pair of the second engaging elements 20 are mounted on both sides of the first engaging element 18 in the longitudinal direction of the base. Then, the first hook 24 of the first engaging element 18 and each second hook 28 of the both second engaging elements 20 are formed on the base 12 so that they project in the directions opposite to each other with respect to an assumed plane P connecting between the respective pillars 22 and 26 (FIG. 2(a)).

The pillar 22 of the first engaging element 18 comprises a rib 22a that extends substantially across the entire height on the side opposite to the first hook 24 (that is, on the same side of the second hooks 28 of the second engaging elements 20). It provides the pillar 22 with stiffness sufficient to bear a specific load (for example, a weight of the supported article) without bend. The rib 22a of the pillar 22 acts as a load bearing element that is engaged with an object to bear the load such as the weight of the object fastened to the base back surface 12b on such object when the mount section 14 is attached to the object properly, as described later.

The first hook 24 of the first engaging element 18 is separated from the pillar 22 and extends in a serpentine manner so that it is supported at its both ends between the distal end of the pillar 22 and the top surface 12a of the base 12. Therefore, the first hook 24 can be displaced elastically so that it is moved toward or away from the pillar 22. On the first hook 24, a recess 24a is formed at the center in the longitudinal direction where the first hook 24 is separated from the pillar 22 and a pair of protuberances 24b and 24c are formed on the both sides of the recess 24a in the longitudinal direction. The recess 24a and the protuberance 24b on the distal side of the first hook 24 act as engagement maintaining elements that are engaged with an object to fixedly hold the article support 10 on the object when the mount section 14 is attached to the object properly, as described later. On the other hand, the recess 24a and the protuberance 24c on the base side of the first hook 24 act as spacer elements that are engaged with an object to define a predetermined minimum distance between the base 12 and the object when the mount section 14 is attached to the object properly, as described later.

The pillar 26 of each second engaging element 20 does not have a rib and has such stiffness that the pillar 26 itself is more flexible than the pillar 22 of the first engaging element 18 but it cannot be bent easily. The pillar 26 is disposed at a position where it is not engaged with an object when the mount section 14 is attached to the object properly, as described later.

The second hook 28 of each second engaging element 20 is separated from the pillar 26 and extends in a serpentine manner so that it is supported at its both ends between the distal end of the pillar 26 and the top surface 12a of the base 12. Therefore, the second hook 28 can be displaced elastically so that it is moved toward or away from the pillar 26. On the second hook 28, a recess 28a is formed at the center in the longitudinal direction where the second hook 28 is separated from the pillar 26 and a pair of protuberances 28b and 28c are formed on the both sides of the recess 28a in the longitudinal direction. The recess 28a and the protuberance 28b on the distal side of the second hook 28 act as engagement maintaining elements that are engaged with an object to fixedly hold the article support 10 on the object when the mount section 14 is attached to the object properly, as described later. On the other hand, the recess 28a and the protuberance 28c on the base side of the second hook 28 act as spacer elements that are engaged with an object to define a predetermined minimum distance between the base 12 and the object when the mount section 14 is attached to the object properly, as described later.

On the base 12, the distance from the assumed plane P to the outward end face of the rib 22a of the pillar 22 of the first engaging element 18 (the end face on the side separated from the first hook 24) is substantially equal to the distance from the assumed plane P to the outward end face of the recess 28a of the second hook 28 of each second engaging element 20 (the end face on the side separated from the pillar 26) and, at the same time, smaller than the distances to the outward end faces of the protuberances 28b and 28c of each second hook 28. Further, the recess 24a and the protuberances 24b and 24c of the first hook 24 of the first engaging element 18 are disposed at the heights from the base top surface 12a that are substantially equal to the recess 28a and the protuberances 28b and 28c of the second hook 28 of each second engaging element 20, respectively.

Further, in the shown embodiment, the pillar 22 of the first engaging element 18 on the base 12 protrudes higher than the pillars 26 of the both second engaging elements 20. Then, in the distal region of the pillar 22 and the first hook 24 where these elements are joined together, a plurality of guide faces 30 are formed for guiding the first hook 24 and the second hooks 28 to the positions where they are engaged with an object by contacting the object while the mount section 14 is attached to the object.

Figure 4:
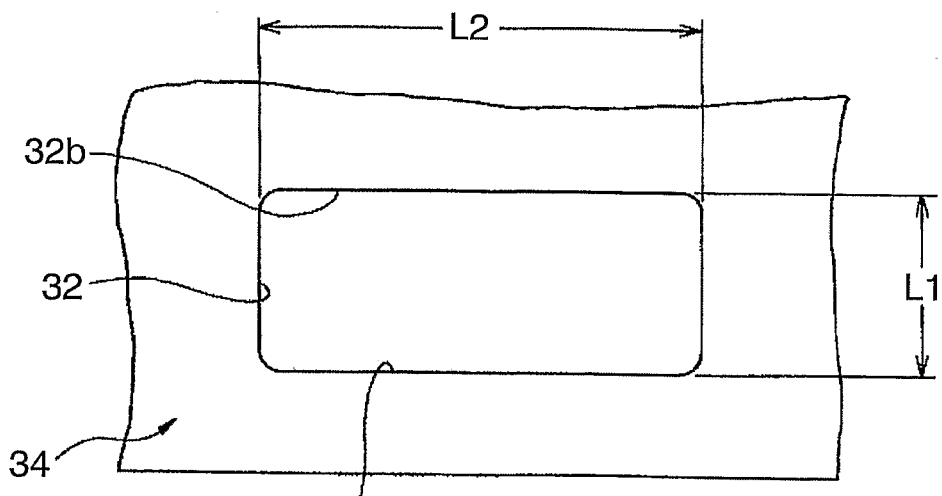
FIG. 4 a plan view showing a principal part of an object to which the article support of FIG. 1 is attached.

As shown in FIGS. 4 and 5, the article support 10 is fixedly attached via the mount section 14 to a thin plate-like object 34 having a substantially rectangular or elliptical opening 32. The operation for attaching the article support 10 is performed by engaging the first and second engaging elements 18 and 20 of the mount section 14 into the opening 32 of the object 34. Here, the opening 32 of the object 34 is shaped so that its minor axis L1 is substantially equal to the distance cc between the outward end face of the rib 22a of the pillar 22 and the outward end face of the recess 24a of the first hook 24 in the first engaging element 18 of the article support 10 (FIG. 2(c)) and its major axis L2 is longer than the distance β between the side end faces (the end faces on the side opposite to the first engaging element 18) of the pair of the second engaging elements 20 of the article support 10 (FIG. 2(b)).

Figure 5A:
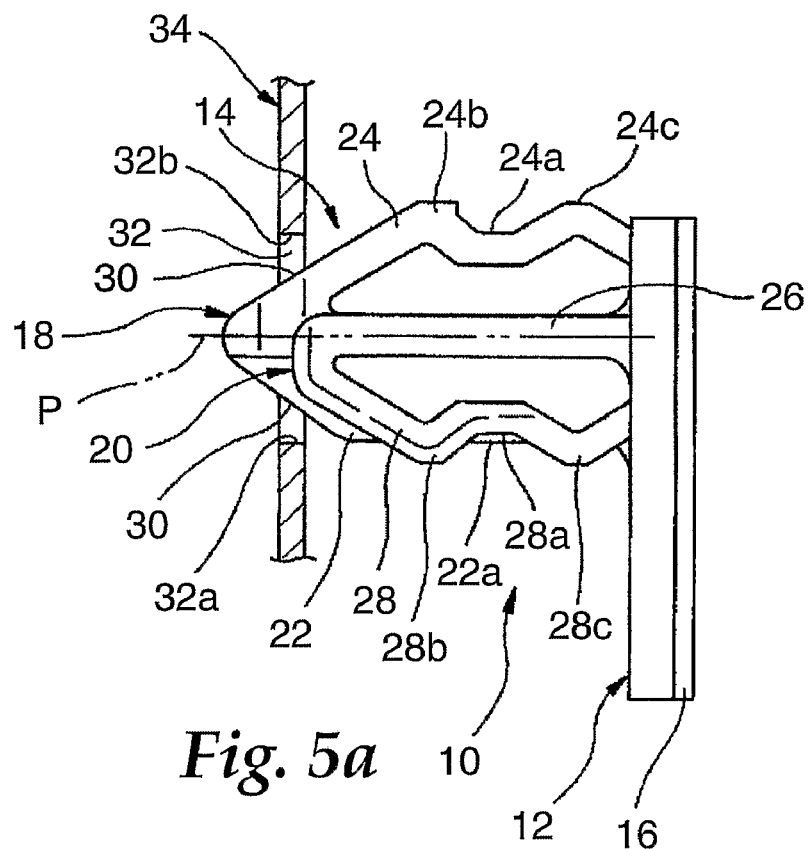
FIG. 5 is an illustration for describing a procedure for attaching the article support of FIG. 1 to the object, wherein (a) shows a state in which the article support is ready for attachment, and (b) shows a state in which the attachment is completed.
Figure 5B:
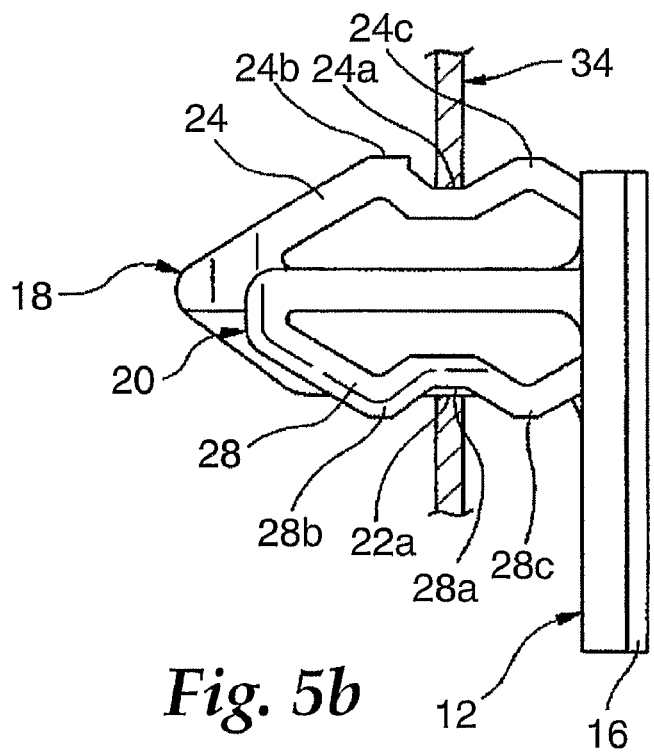

Therefore, in the engaging operation described above, while the assumed plane P on the base 12 of the article support 10 is oriented substantially parallel to the major axis L2 of the opening 32 of the object 34 (FIG. 5(a)), the first and second engaging elements 18 and 20 are inserted into the opening 32 by applying a pressing force to the base 12 in the direction toward the object 34. Along with this inserting operation, the outward end faces of the rib 22a and the first hook 24 of the first engaging element 18 are pressed against a pair of longer edges 32a and 32b of the opening 32, respectively. As the inserting operation proceeds, the first hook 24 is pressed by one of the longer edges of the opening 32 (the longer edge 32b in the figures) and bent elastically in the direction toward the pillar 22 and, then, restored elastically to receive the longer edge 32b in the recess 24a when the protuberance 24b on the distal side gets over the longer edge 32b (FIG. 5(b)). In this state, the rib 22a of the pillar 22 abuts against the other longer edge of the opening 32 (the longer edge 32a in the figures).

During the inserting operation described above, the outward end face of the second hook 28 of each second engaging element 20 is pressed against the longer edge of the opening 32 on the side against which the pillar rib 22a of the first engaging element 18 abuts (the longer edge 32a in the figures). On the other hand, the pillar 26 of each second engaging element 20 is disposed apart from the other longer edge of the opening 32 (the longer edge 32b in the figures). As the inserting operation proceeds, each second hook 28 is pressed by the longer edge of the opening 32 (the longer edge 32a in the figures) and bent elastically in the direction toward the pillar 26 and, then, restored elastically to receive the longer edge 32a in the recess 28a when the protuberance 28b on the distal side gets over the longer edge 32a (FIG. 5(b)).

When the longer edges 32a and 32b of the opening 32 of the object 34 are received in the recesses 24a and 28a of the first hook 24 and the second hooks 28 of the article support 10, respectively, the pressing force to the base 12 for engaging the first and second engaging elements 18 and 20 into the opening 32 is released. In this state, the protuberances 24b and 28b on the distal side of the first hook 24 and the second hooks 28 hold the article support 10 on the object 34 so that the article support 10 does not fall off the opening 32. At the same time, the protuberances 24c and 28c on the base side of the first hook 24 and the second hooks 28 define a predetermined distance between the base 12 and the object 34.

As described above, the article support 10 is fixedly held in the opening 32 of the object 34 and attached to the object 34 by cooperation between the first hook 24 of the first engaging element 18 and the second hooks 28 of the pair of the second engaging elements 20. In this state in which the article support 10 is attached to the object 34 properly, the article support 10 is substantially maintained in a stationary manner in the direction of the minor axis L1 of the opening 32 by engaging the rib 22a of the pillar 22 and the first hook 24 of the first engaging element 18 with the longer edges 32a and 32b of the opening 32 of the object 34 at the same time, respectively. Further, the second hooks 28 of the second engaging elements 20 disposed on the both sides of the first engaging element 18 are engaged with one of the longer edges of the opening 32 of the object 34 (the longer edge 32a in the figures) and act so as to prevent the first engaging element 18 from being rotated in the opening 32. Therefore, the article support 10 can be attached to the opening 32 of the object 34 stably without play. Here, though the relationship between the article support 10 and the object 34 shown in the figures is defined for applications in which the article support 10 is allowed to be moved in the direction of the major axis L2 of the opening 32, the article support 10 can also be secured in the direction of the major axis L2 by appropriately defining the dimensional relationship between them.

Here, in applications where any load including a component in the direction parallel to the base top surface 12a is applied to the article support 10 attached properly, it is advantageous that the rib 22a of the pillar 22 of the first engaging element 18 is oriented so that it is disposed on the front side when viewed in the direction of the load. In such configuration, the engagement maintaining function can be exhibited stably because the pillar 22 of the first engaging element 18 bears the load properly by its own stiffness and, on the other hand, the load is not applied to the first hook 24 of the first engaging element 18. Further, the second hooks 28 of the second engaging elements 20 can also exhibit the engaging maintaining function while they bear their share of the load. As a result, the positional displacement of the article support 10 with respect to the article can be prevented because the article support 10 can be fixedly held in the opening 32 of the object 34 by the first and second hooks 24 and 28 stably and, further, the load concentration on the first engaging element 18 and, thus, the stress concentration on the pressure sensitive adhesive double coated tape 16 (the adhesive layer) can be avoided. Moreover, as the load bearing construction provided on the object 34 accordingly for allowing the mount section 14 to exhibit the load bearing function is constructed by the edges of the opening 32, which is formed as an indispensable element for engagement with the first and second hooks 24 and 28, versatility is imparted to the article support 10 so that it is not necessary to provide the object 34 with any special load bearing construction.

Further, in the operation to automatically attach the article, for example, when the article support 10 is fastened to the article with some rotation with respect to the normal position or the opening 32 of the object 34 is formed with some deviation from the normal contour, the first and second engaging elements 18 and 20 may be inserted into the opening 32 while the assumed plane P on the base 12 of the article support 10 is still not oriented substantially in parallel with the major axis L2 of the opening 32 of the object 34. In such case, if the first engaging element 18 of the article support 10 is inserted into the opening 32, either one of the second engaging elements 20 can be engaged with one of the longer edges of the object 34 (the longer edge 32a in the figures) while its second hook 28 is bent considerably. Therefore, even when the article support 10 and the opening 32 of the object are in positions offset from each other in the rotational direction, the mount section 14 can show adaptability to a certain error range wherein at least one of the second hooks 28 can cooperate with the first hook 24 to fixedly hold the article support 10 in the opening 32 of the object stably.

Still further, in the operation to automatically attach the article, for example, when the article support 10 is somewhat offset from the normal attachment position in the opening 32 of the object, the guiding faces 30 of the first engaging element 18, which is inserted into the opening 32 earlier, make contact with the edges of the opening 32 and slide thereon as appropriate so as to automatically guide the first hook 24 and the second hooks 28 to the positions where they are engaged with the longer edges 32a and 32b of the opening 32. Here, as the positioning construction provided on the object 34 accordingly for allowing the guiding faces 30 of the first engaging element 18 to exhibit the guiding function is constructed by the edges of the opening 32, which is formed as an indispensable element for engagement with the first and second hooks 24 and 28, versatility is imparted to the article support 10 so that it is not necessary to provide the object 34 with any special positioning construction.

The article support 10 having the configuration as described above achieves a remarkable effect particularly in applications where the base 12 is fastened to the article to be supported in advance and the article support 10 is attached to the object 34 along with the article routinely. As an example of such application, the article support 10 can preferably be used as a support for temporal fixing during curing of adhesive when a stationary window glass for a car is bonded to a window frame of a car body. Generally, the stationary window glass of the car is secured to the window frame of the car body in an airtight manner via thermosetting adhesive (sealant) over an entire edge of the glass panel, wherein it is required to fixedly hold the glass panel by using the support for temporal fixing so that the glass panel is not moved by vibrations due to other manufacturing operations, air pressure variations within the cabin, and the like till the adhesive is cured.

Figure 6:
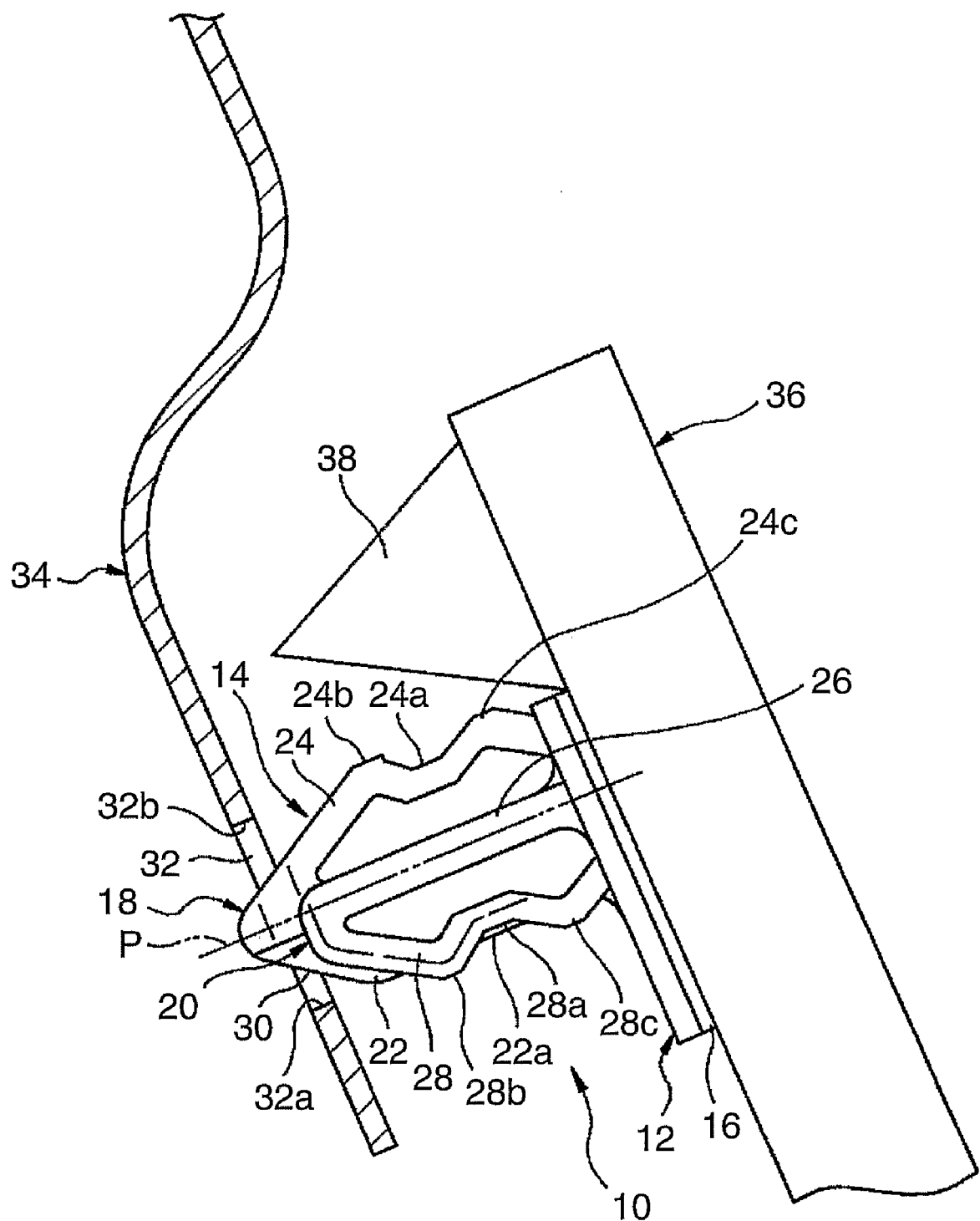
FIG. 6 is an illustration showing an exemplary application of the article support of FIG. 1 in the state in which the article support is ready for attachment to the object.
Figure 7:
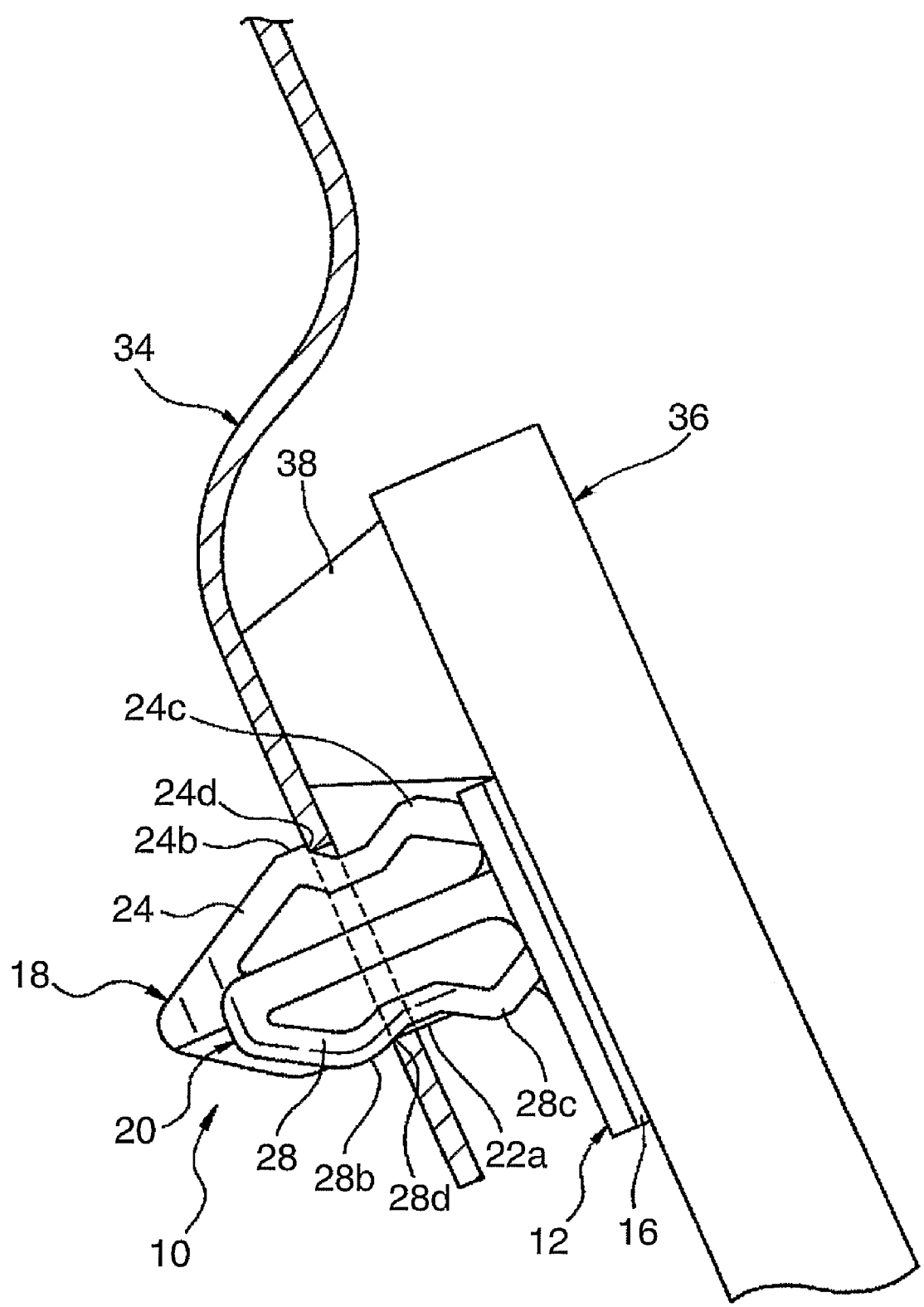
FIG. 7 is an illustration showing an exemplary application of the article support of FIG. 1 in the state in which the attachment to the object is completed.

Hereinafter, with reference to FIGS. 6 and 7, an exemplary application of the article support 10 to the stationary window glass of the car will be described. In this exemplary application, the description will be provided on the assumption that an inward flange portion of the window frame of the car body acts as the object 34 shown in FIGS. 4 and 5 (that is referred to as a flange 34 in this exemplary application). At a plurality of predetermined positions of the flange 34, the openings 32 for attaching the article supports 10 are formed. On the other hand, thermosetting adhesive 38 in an uncured state is applied in a strip-like manner along the outer edge of one surface (the surface toward the inside of the car body) of the glass panel 36 acting as the article to be supported and the article supports 10 are fastened via pressure sensitive adhesive double coated tape 16 disposed on the base back surfaces 12b to a plurality of predetermined positions (the positions corresponding to the plurality of openings 32 of the flange 34) in the inside and in the neighborhood of the thermosetting adhesive 38. At this time, the mount section 14 of each article support 10 is in the condition in which the first and second engaging elements 18 and 20 are projected from the surface of the glass panel 36 to a height preferably exceeding the thermosetting adhesive 38 (FIG. 6). Here, an adhesive flow preventing element called a dam rubber may further be secured to the glass panel 36 on the lower side in the direction of gravity.

Here, generally speaking, the positions for temporarily fixing the glass panel 36 on the window frame of the car body are determined at least along the flange 34 on the topside of the window frame of the car body so as to effectively bear the gravity applied to the glass panel 36. At this time, the flange 34 of the window frame of the car body typically extends in a narrow width along the contour of the window frame and, in the limited attachment area, it is required to attach the article supports 10 to the flange 34 with sufficient mechanical strength. To this end, the openings 32 each extending substantially elliptically in the extending direction of the flange 34 on the topside of the window frame of the car body are formed on the flange 34 and, on the other hand, each article support 10 is oriented so that the first and second engaging elements 18 and 20 thereof are aligned along the major axis of the flange openings 32 and so that the rib 22a of the pillar 22 of the first engaging element 18 is positioned on the lower side in the direction of gravity (FIG. 6).

The glass panel 36, on which a predetermined number of the article supports 10 are fastened at predetermined positions, is lifted up manually or by machine (for example, by robot) and, then, the mount sections 14 of these article supports 10 are aligned with the corresponding openings 32 provided in the flange 34 and inserted thereinto. During this inserting operation, if the position of each article support 10 is somewhat offset from the corresponding opening 32, with the help of the self-positioning effect exhibited by the guiding faces 30 of the first engaging element 18 of each article support 10, the first and second hooks 24 and 28 of each article support 10 are automatically guided to the positions where they are engaged with the longer edges 32a and 32b of the opening 32 so that the position of the glass panel 36 with respect to the flange 34 is corrected, as described above. Then, after the inserting operation is completed, each article support 10 is attached to the flange 34 defining a predetermined distance between the base 12 and the flange 34 by cooperation between the first hook 24 of the first engaging element 18 and at least one of the second hooks 28 of the second engaging elements 20 as described above and the glass panel 36 is temporarily fixed at a predetermined position of the window frame of the car body (FIG. 7).

Here, in this state in which the glass panel 36 is temporarily fixed, the uncured thermosetting adhesive 38 (as well as the dam rubber, if used) tends to urge the glass panel 36 in the direction to move away from the flange 34 by its own resiliency. Therefore, the protuberances 24b and 28b on the distal side of the first hook 24 and the second hooks 28 of each article support 10 are engaged with the longer edges 32a and 32b of the flange 34, in particular, at the rising face 24d of the protuberance 24b and the inclined face 28d of the protuberance 28b, to fixedly hold the article support 10 on the object 34 so that it does not fall off the opening 32 (FIG. 7).

In the state in which the glass panel 36 is temporarily fixed as described above, on each article support 10, the first and second engaging elements 18 and 20, which are aligned along the major axis of the opening 32 of the flange 34, bear the weight of the glass panel 36 in a distributed manner on the rib 22a of the pillar 22 mainly and on the second hooks 28 in an auxiliary manner. Therefore, the first and second hooks 24 and 28 of the first and second engaging elements 18 and 20 are engaged with the longer edges 32a and 32b of the flange opening 32 stably so as to fixedly hold the article support 10 on the flange 34 without being bent by a load such as the weight of the glass panel 36 and the like. Moreover, while the article support 10 bears the load such as the weight of the glass panel 36 and the like, as the load concentration on the first engaging element 18 and, consequently, the stress concentration on the pressure sensitive adhesive double coated tape 16 (the adhesive layer) can be avoided, the positional displacement of each article support 10 with respect to the glass panel 36 can be prevented effectively.

Further, when the operation for temporarily fixing the window glass described above is performed by robot, because the mount sections 14 of the article supports 10 have adaptability to a certain error range as described above, if only each article support 10 on the glass panel 36 is aligned with the corresponding opening 32 of the flange 34 with high accuracy, the mount sections 14 can be inserted into the openings 32 automatically so that the first and second hooks 24 and 28 can be engaged with the longer edges 32a and 32b of the openings 32 stably, even when there is a relative positional offset between the article support 10 and the opening 32 in the rotational direction.

Still further, the first and second hooks 24 and 28 of the first and second engaging elements 18 and 20 of the article support 10 ensure a predetermined minimum distance between the flange 34 and the glass panel 36 by their spacer elements 24a, 24c, 28a and 28c. Therefore, the thermosetting adhesive 38 disposed along the outer edge of the glass panel 36 in advance can be cured stably between the flange 34 and the glass panel 36 so as to fasten them to each other in an airtight manner.

Hereinabove, though a preferred embodiment of the present invention has been described, the configuration of the article support according to the present invention is not limited to the embodiment described above and several variations can be made.

Figure 8A:
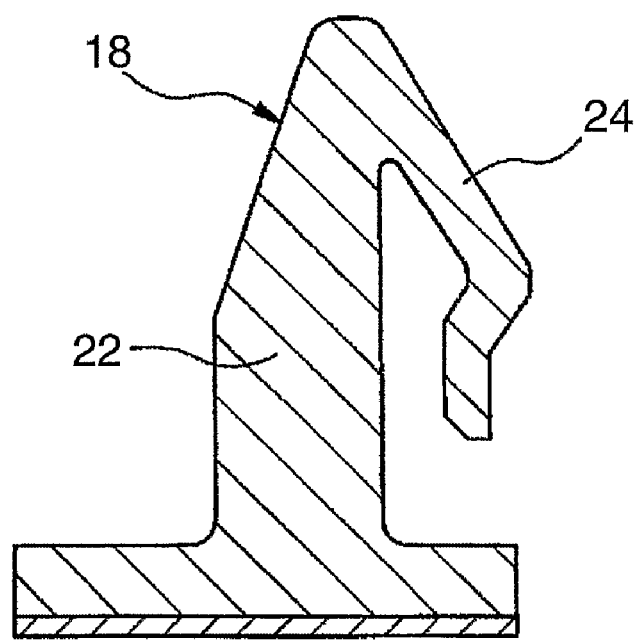
FIG. 8 is an illustration showing a modification of the article support, wherein (a) is a cross-sectional view corresponding to FIG. 3(a), and (b) is a cross-sectional view corresponding to FIG. 3(b).
Figure 8B:
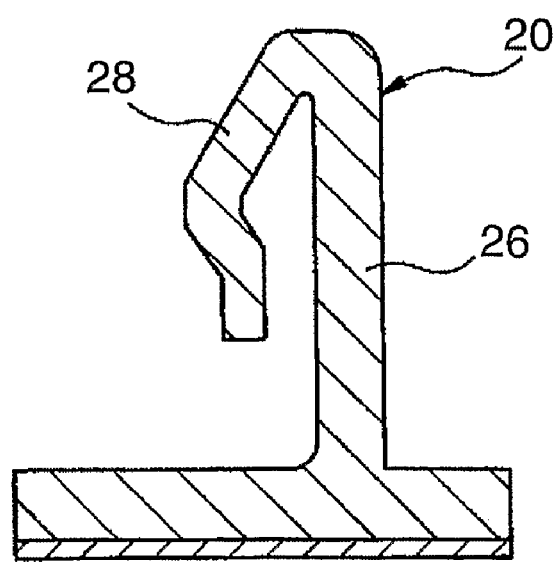

For example, as shown in FIGS. 8(a) and 8(b), at least one of the first and second hooks 24 and 28 of the first and second engaging elements 18 and 20 may be supported by the pillars 22 and 26 in a cantilevered manner. Further, if a complicated operation due to use of two elements can be accepted, as means for fastening the base 12 to the object to be supported, a hook-and-loop fastener structure in which a plurality of headed elements stand on the base back surface 12b may be adopted in place of the pressure sensitive adhesive double coated tape 16. In this case, the article supports 10 are attached to the openings 32 of the object 34 in advance solely when these are used. Also in the case of such article supports, the article supports can be attached to the object stably thanks to the effect of the mount sections having a distinctive configuration as described above.

What is claimed is:

1. An article support comprising a base and a mount section, for supporting an article secured to said base on an object via attachment of at least each of a first and two second engaging elements, said mount section comprising:
the first engaging element, the first engaging element including a pillar protruding from said base, said pillar having first and second opposed sides, and a first hook extending from said first side of said pillar in an elastically displaceable manner; and
the two second engaging elements, the two second engaging elements being disposed at opposite sides of said first engaging element, each second engaging elements including a pillar protruding from said base, said pillar having first and second opposed sides, and a second hook extending from said first side of said pillar in an elastically displaceable manner, with said pillar of said first engaging element and said pillars of said second engaging elements all being spaced apart from each other on said base,
wherein said first hook and said second hook being elastically displaceable independently of each other, and being disposed opposite to each other with respect to said pillars, wherein at least one of said second sides of said pillars is free of a hook positioned opposite a hook extending from said first side of the respective pillar.

2. An article support as set forth in claim 1, wherein said pillar of said first engaging element protrudes higher than said pillars of each of said second engaging elements on said base.

3. An article support as set forth in claim 2, wherein said pillar of said first engaging element includes a guide face that is able to contact the object during an attaching operation of said mount section to the object for guiding said first hook and said second hook toward a position for engagement with the object.

4. An article support as set forth in claim 1, wherein, when said mount section is attached to the object, said pillar of said first engaging element bears a load on the object, and said first hook and said second hook are engaged with the object to fixedly hold the article support on the object.

5. An article support as set forth in claim 3, wherein, when said mount section is attached to the object, said pillar of said first engaging element bears a load on the object, and said first hook and said second hook are engaged with the object to fixedly hold the article support on the object.

6. An article support as set forth in claim 1, wherein at least one of said first hook and said second hook is supported at its both ends between said base and said pillar.

7. An article support as set forth in claim 4, wherein at least one of said first hook and said second hook is supported at its both ends between said base and said pillar.

8. An article support as set forth in claim 1, wherein at least one of said first hook and said second hook includes a spacer element for defining a predetermined minimum distance between said base and said object when said mount section is attached to the object.

9. An article support as set forth in claim 4, wherein at least one of said first hook and said second hook includes a spacer element for defining a predetermined minimum distance between said base and said object when said mount section is attached to the object.

10. An article support as set forth in claim 6, wherein at least one of said first hook and said second hook includes a spacer element for defining a predetermined minimum distance between said base and said object when said mount section is attached to the object.

11. An article support as set forth in claim 7, wherein at least one of said first hook and said second hook includes a spacer element for defining a predetermined minimum distance between said base and said object when said mount section is attached to the object.

* * * * *